(12) United States Patent
Okhravi et al.

(10) Patent No.: US 9,712,501 B2
(45) Date of Patent: Jul. 18, 2017

(54) PACKET HEADER RANDOMIZATION

(71) Applicant: Massachusetts Institute of Technology, Cambridge, MA (US)

(72) Inventors: Hamed Okhravi, Billerica, MA (US); Richard W. Skowyra, Somerville, MA (US); Kevin Bauer, Westford, MA (US); William W. Streilein, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 120 days.

(21) Appl. No.: 14/919,246

(22) Filed: Oct. 21, 2015

(65) Prior Publication Data

US 2017/0118176 A1    Apr. 27, 2017

(51) Int. Cl.
H04L 29/06    (2006.01)

(52) U.S. Cl.
CPC .......... *H04L 63/0428* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,234,059 B1* | 6/2007 | Beaver | H04L 9/0833 380/283 |
| 8,533,465 B2* | 9/2013 | Trostle | H04L 63/0428 709/225 |
| 8,612,750 B2* | 12/2013 | Garcia | H04L 9/30 380/255 |
| 2002/0026503 A1 | 2/2002 | Bendinelli et al. | |
| 2003/0086422 A1 | 5/2003 | Klinker et al. | |
| 2007/0130366 A1* | 6/2007 | O'Connell | H04L 45/586 709/238 |
| 2010/0211661 A1 | 8/2010 | Morimoto et al. | |

(Continued)

OTHER PUBLICATIONS

Antonatos, et al., "Defending against Hitlist Worms using Network Address Space Randomization", In Proceedings of the 2005 ACM workshop on Rapid malcode (WORM '05). ACM, New York, NY, USA, pp. 30-40, Nov. 11, 2005.

(Continued)

*Primary Examiner* — Michael R Vaughan
(74) *Attorney, Agent, or Firm* — Nields, Lemack & Frame, LLC

(57) ABSTRACT

A system and method for the randomization of packet headers is disclosed. A controller is used to provide random values, also referred to as nonces, that replace the source and destination addresses that typically appear in a packet header. The controller also provides routing rules to the switches and routers in the network that allow these devices to properly route packets, even though the source and destination addresses are not present. In some embodiments, network devices that support software-defined networking (SDN) are employed. The number of times that a particular nonce is used may be variable. In some embodiments, a nonce is used for exactly one packet header. In this way, packets may traverse a network using nonces in place of actual source and destination addresses. Because the nonces are changed periodically, detection of traffic patterns is made significantly more difficult.

19 Claims, 9 Drawing Sheets

(56) References Cited

U.S. PATENT DOCUMENTS

| | | | |
|---|---|---|---|
| 2010/0250930 A1* | 9/2010 | Csaszar | H04L 29/12066 |
| | | | 713/168 |
| 2010/0278120 A1 | 11/2010 | Haddad et al. | |
| 2012/0110144 A1 | 5/2012 | Rossi | |
| 2015/0244617 A1 | 8/2015 | Nakil et al. | |
| 2016/0253533 A1* | 9/2016 | Bhargava | G01S 5/0215 |
| | | | 340/10.1 |

OTHER PUBLICATIONS

Jafarian, et al., "OpenFlow Random Host Mutation: Transparent Moving Target Defense using Software Defined Networking", In Proceedings of the first workshop on Hot topics in software defined networks (HotSDN '12). ACM, New York, NY, USA, pp. 127-132, Aug. 13, 2012.

Chen, et al., "HORNET: High-speed Onion Routing at the Network Layer", In Proceedings of the 22nd ACM SIGSAC Conference on Computer and Communications Security (CCS '15). ACM, New York, NY, USA, pp. 1441-1454, Oct. 16, 2015.

International Search Report and Written Opinion mailed May 19, 2017 in corresponding PCT application No. PCT/US16/48117.

* cited by examiner

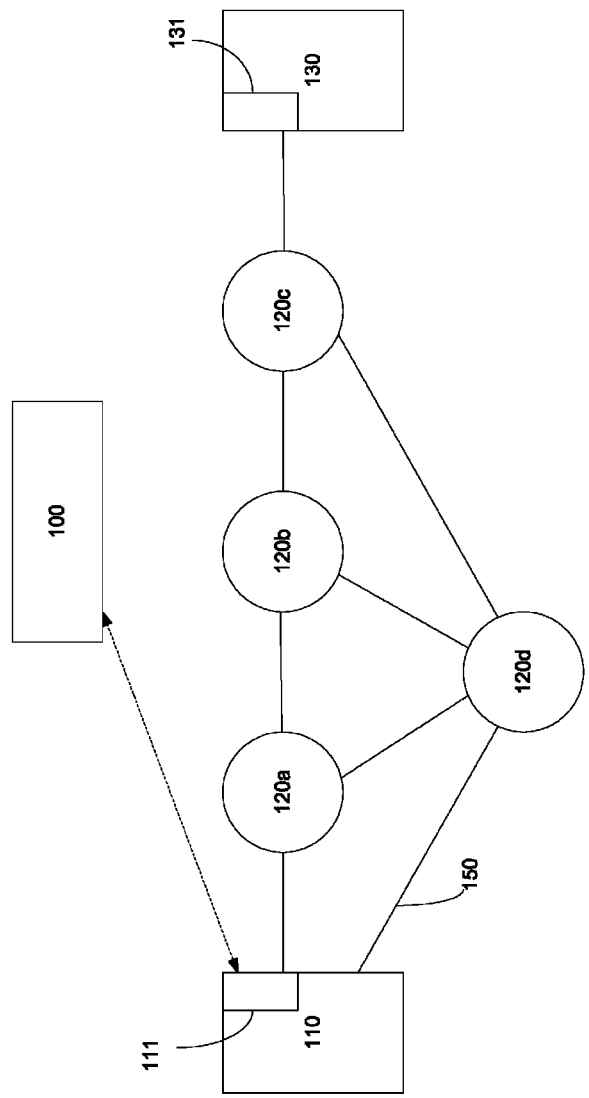

| Nonce | Port Number |
|---|---|
| 4825 | 3 |
| 9147 | 7 |
| 6039 | 1 |
| 7019 | 6 |
| 2735 | 3 |
| 1234 | 2 |
| 8975 | 7 |

FIG. 4

PACKET HEADER RANDOMIZATION

This invention was made with government support under FA8721-05-C-0002 awarded by the U.S. Air Force. The government has certain rights in the invention.

Embodiments of the present disclosure relate to a system and method for creating randomized packet headers, and for forwarding packets with randomized headers through a network.

BACKGROUND

Security breaches have become more common in the last decade. There are a variety of techniques that an intruder may use to access and compromise a network. For example, by hijacking, or taking control of, a router or switch in a network, the intruder may be able to monitor all of the network traffic passing through that router or switch.

There are mechanisms that prevent the content, or payload, of a packet from being compromised. For example, in certain embodiments, the payload may be encrypted. Protocols, such as IPSec, have been developed to prevent the compromise of data payloads.

However, even in systems employing payload encryption, the packet header is not encrypted. The network devices, such as gateways, routers and switches, which deliver packets from a source to a destination, must be able to read these packet headers so that these devices may properly route the packet through the network. Encryption of the header would necessarily make the source address and destination address unreadable by these devices, thereby making the packet unroutable.

Unfortunately, the ability to monitor only packet headers in a network still provides an intruder with valuable information. For example, the intruder is able to monitor traffic patterns, such as which nodes communicate with one another, and which nodes are accessed by most of the other nodes. Based on these traffic patterns, it may be possible for an intruder to determine the identity, including IP address, of the various servers in the network. Further, through more sophisticated analysis, an intruder may also be able to identify the operating system used by the clients and servers in the network.

This may be valuable information that provides the intruder with sufficient information to launch a targeted attack on that network.

To date, this vulnerability has not been addressed. Therefore, it would be beneficial if there was a system and method that allowed the packet headers to be encoded or otherwise protected so that an intruder would be unable to detect IP addresses and traffic patterns. Further, it would be advantageous if this system and method could utilize existing network infrastructure and incur minimal overhead.

SUMMARY

A system and method for the randomization of packet headers is disclosed. A controller is used to provide random values, also referred to as nonces, that replace the source and destination addresses that typically appear in a packet header. The controller also provides routing rules to the switches and routers in the network that allow these devices to properly route packets, even though the source and destination addresses are not present. In some embodiments, network devices that support software-defined networking (SDN) are employed. The number of times that a particular nonce is used may be variable. In some embodiments, a nonce is used for exactly one packet header. In this way, packets may traverse a network using nonces in place of actual source and destination addresses. Because the nonces are changed periodically, detection of traffic patterns is made significantly more difficult.

BRIEF DESCRIPTION OF THE FIGURES

For a better understanding of the present disclosure, reference is made to the accompanying drawings, which are incorporated herein by reference and in which:

FIGS. 2A-2D shows a sequence of communications between the various components in the network and the controller used to deliver a packet with a randomized packet header to a destination according to one embodiment;

FIG. 4 shows the structure of routing rules according to one embodiment;

DETAILED DESCRIPTION

Figure 1:
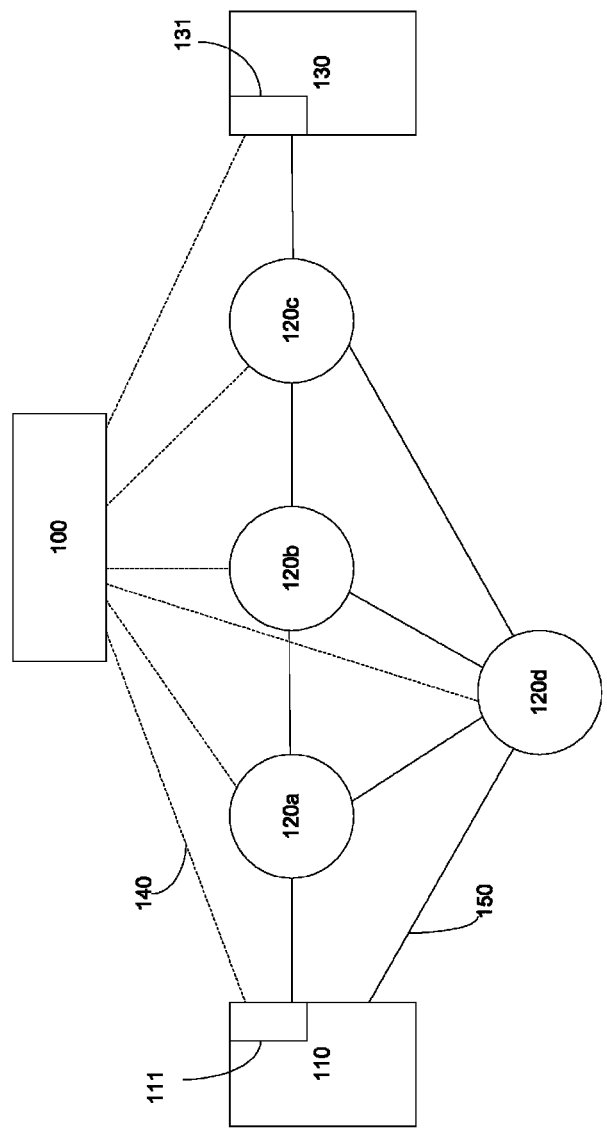
FIG. 1 shows a representative configuration of a network according to one embodiment.

FIG. 1 shows a representative configuration of a network which may employ the randomized packet headers described in this disclosure. The network comprises one or more clients. These clients may be workstations, personal computers, servers, printers, or any other device which is capable of sending or receiving network traffic. As such, each client includes a processing unit, which is in communication with a storage element. The processing unit may be any suitable device, such as a microprocessor, a special purpose processor, or a microcontroller. The number of clients that may be included in the network is not limited by this disclosure.

For purposes of clarity, FIG. 1 shows only two clients. The first client, or source 110, is attempting to send a packet to a second client, or destination 130. Of course, the mechanism described herein also operates in a like manner when destination 130 attempts to send a packet to source 110 or to any other client.

The network also includes one or more network devices 120*a*-120*d*, such as switches and routers. These network devices 120*a*-120*d* are used to route packets through the network from a source to a destination. Again, the specific implementation of the network devices 120*a*-120*b* is not limited by this disclosure. Each network device 120*a*-120*d* may include a processing unit and an associated storage element. The storage element may be used to store instructions executed by the processing unit, and to store routing rules delivered by the controller 100. Thus, the processing unit, when executing instructions stored in the storage element, is capable of performing the functions described below.

A controller 100 is also employed in this network. The controller 100 is responsible for creating the random codes, or nonces, that replace the traditional source address and destination address in each packet header. The controller 100 is also responsible for providing routing rules to the network devices 120*a*-120*d* to allow a packet to traverse the network. The controller 100 may have a processing unit and an associated storage element. The storage element may comprise the instructions required to perform the functions described herein. In certain embodiments, the controller 100 may be a general purpose computer, such as a personal computer or server. In other embodiments, the controller 100 may be a specialized system. In certain embodiments, at least portions of the instructions are written in a computing language specialized for networking, such as the Flowlog network programming language. The set of instructions that perform the functions described herein may be referred to as a software component. This software component is stored on a non-transitory storage medium, such as the storage element of the controller 100.

In certain embodiments, the controller 100 and the network devices 120a-120d may utilize a software-defined networking (SDN) architecture. In this embodiment, the controller 100 is capable of delivering routing rules to each network device 120a-120d. For a switch, these routing rules may include, for example, a table having two columns. The first column may comprise the destination address, while the second column represents the associated port through which any packet having that destination address is to be transmitted. These routing rules may be stored in the respective storage element of each network device 120a-120d.

The clients and the network devices 120a-d exchange data over communication links 150. These communication links 150 may be physical cables, where Ethernet or any other suitable protocol is transacted over the cable. Control information is exchanged between the clients and the controller 100 and between the network devices 120a-120d and the controller 100 over control channels 140. In certain embodiments, the control channels 140 may be separate from the communication links 150. For example, one or more network devices 120a-120d may have a port dedicated to communication with the controller 100. In other embodiments, the control channels 140 may be the same physically as the communication links 150. In other words, control information between network device 120d and controller 100 may travel over one or more communication links 150 to reach the controller 100. In yet other embodiments, the control information between one of the network devices, such as network device 120d, and controller 100 may travel over one or more communication links 150 to reach a second network device, such as network device 120a, which then uses a dedicated control channel 140 to communicate with the controller 100. Thus, although FIG. 1 shows separate connections for data packets and control information, it is understood that various configurations may be used to communicate the control information, where some of these configurations use the communication links 150 that are used for data packets.

Additionally, each client has a software component, referred to as a proxy. In the source 110, there is a source proxy 111; while the destination 130 includes a destination proxy 131. In certain embodiments, the proxy may include the software necessary to serve both as a source and a destination. In other embodiments, each client may include two software components; one configured to transmit packets and the second configured to receive packets. As described above, each client includes a processing unit and an associated storage element. The software that comprises the proxy may be executed by the processing unit. Further, the software that comprises the proxy may be stored in the storage element. In certain embodiments, the proxies are written using C or another suitable programming language.

Having described the structure and components of the system, an explanation of the operation of the network follows.

Referring to FIG. 1, the following explanation assumes that source 110 wishes to send a packet to destination 130. To do so, the packet must traverse at least one of the network devices 120a-120d. In this particular example, it is assumed that the packet will travel through network devices 120a-120c, although the disclosure is not limited to any particular route.

First, the source 110 creates a packet for transmission to destination 130. In certain embodiments, this packet is created using the same techniques that are common in the art. In other words, the packet is created as though the source and destination addresses will be included in the packet. The completed packet is then delivered to the source proxy 111. The source proxy 111 then forwards the source and destination addresses to the controller 100, as shown in FIG. 2A, using a first control message, also referred to as a Header Randomization Request. Note that the communications between the source proxy 111 and the controller 100 may be encrypted, such that the information being exchanged between the source proxy 111 and the controller 100 is not visible to others on the network. As described above, there may be a dedicated control channel between the source 110 and the controller 100. In other embodiments, the source proxy 111 may transfer the Header Randomization Request message over the communication link 150, where one of the network devices 120a-120d ultimately delivers it to the controller 100.

The controller 100 receives the Header Randomization Request message. The controller 100 then assigns a set of nonces to the source and destination addresses that were contained in the Header Randomization Request message. These nonces are randomly generated values that serve to mask the actual addresses. As an example, assume that source 110 has a source address of 0001 and destination 130 has a destination address of 0006. In a typical network, all packets transferred between these two devices would include both values. In this network, the values of 0001 and 0006 are provided to the controller 100. The controller then provides a set of nonces that replace these values. For example, the controller 100 may select nonces having values 4825 and 9147 to use in place of the source and destination addresses in this packet. Note that these nonces have no relationship to the original source and destination addresses.

The controller 100 then sends a second control message to the source proxy 111 with the nonces that are to be used for this particular packet. This second control message is also referred to as a Header Randomization Reply. The source proxy 111 then replaces the source and destination addresses in the packet with the returned nonce values. The source proxy 111 also performs any other required functions. For example, the packet header may include a checksum. The use of nonces instead of actual source and destination addresses may affect the checksum. The source proxy 111 will recalculate the checksum of the packet header using the nonces prior to transmission.

In certain embodiments, the source proxy 111 performs this function every time it wishes to send a packet. In other words, in certain embodiments, each data packet uses a unique set of nonces, which is only valid for that packet. However, other embodiments are also possible. For example, in certain embodiments, the controller 100 may return a set of nonces, and also provide a validity indicator. For example, the controller 100 may provide a set of nonces with a time duration for which these nonces are valid. For example, the controller 100 may indicate that this set of nonces may be used for all packets for the next 0.5 seconds. In other embodiments, the controller 100 may specify the number of times that the set of nonces may be used. For example, the controller 100 may provide a set of nonces and indicate that this set may be used 5 times. In yet another embodiment, in response to the Header Randomization Request message, the controller 100 may provide the source proxy 111 with a plurality of sets of nonces. For example, the controller 100 may provide the source proxy with 10 sets of nonces, all of which are valid for this set of source and destination address. In this embodiment, the source proxy 111 may use any of these sets of nonces when sending a packet to this destination. In certain embodiments, the set of nonces are arranged in a ring, such that each set of nonces is used once by the source proxy 111 before any set is used a second time. The controller 100 may also provide an indication of validity for this plurality of sets of nonces, as described above, if desired. In other words, the controller 100 may send 10 sets of nonces to the source proxy 111, with an indication that each may only be used 5 times.

Figure 3:
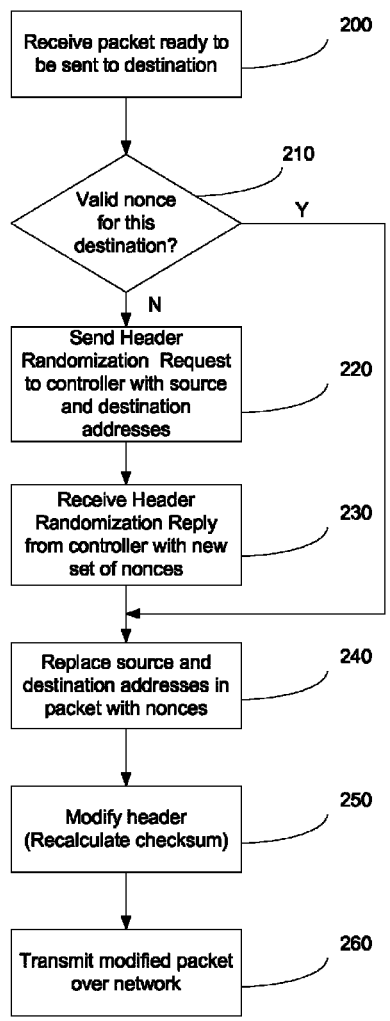
FIG. 3 shows a flowchart representing the operation of the source proxy according to one embodiment.

FIG. 3 shows a flowchart of the operation of the source proxy 111. As described above, the source proxy 111 may be a software component which may be executed by the processing unit associated with the source 110. As such, the instructions required to execute the sequence shown in FIG. 3 may be stored in a non-transitory storage medium, such as the storage element associated with the source 110. These instructions, when executed by the processing unit, perform the functions shown in FIG. 3.

As seen in Process 200, the source proxy 111 receives a data packet that is ready for transmission. The source proxy 111 first checks if there are any valid sets of nonces that can be used for this destination, as shown in Process 210. For example, as described above, during a previous interaction, the controller 100 may have delivered one or more sets of nonces that can be used more than once.

If there is no valid nonce, the source proxy 111 sends a Header Randomization Request message to the controller 100, as shown in Process 220. This Header Randomization Request message includes the source and destination addresses from the packet that the source proxy 111 is processing. The source proxy 111 then receives a Header Randomization Reply message from the controller 100, providing the requested nonces for this set of source and destination addresses, as shown in Process 230. As described above, the Header Randomization Reply message from the controller 100 may include an indication of validity with the nonces, or may include a plurality of sets of nonces for use with this particular set of source and destination addresses.

The source proxy 111 then replaces the source and destination addresses in the packet with the nonces, as shown in Process 240. Note that if the source proxy 111 already had a valid set of nonces, it jumps directly to this process.

After replacing the source and destination addresses with the nonces, the source proxy 111 may further modify the packet header, as shown in Process 250. For example, the source proxy 111 may recalculate the checksum for the packet header.

After these processes are complete, the source proxy 111 then permits the modified packet to be transmitted over the network, as shown in Process 260.

Figure 2B:
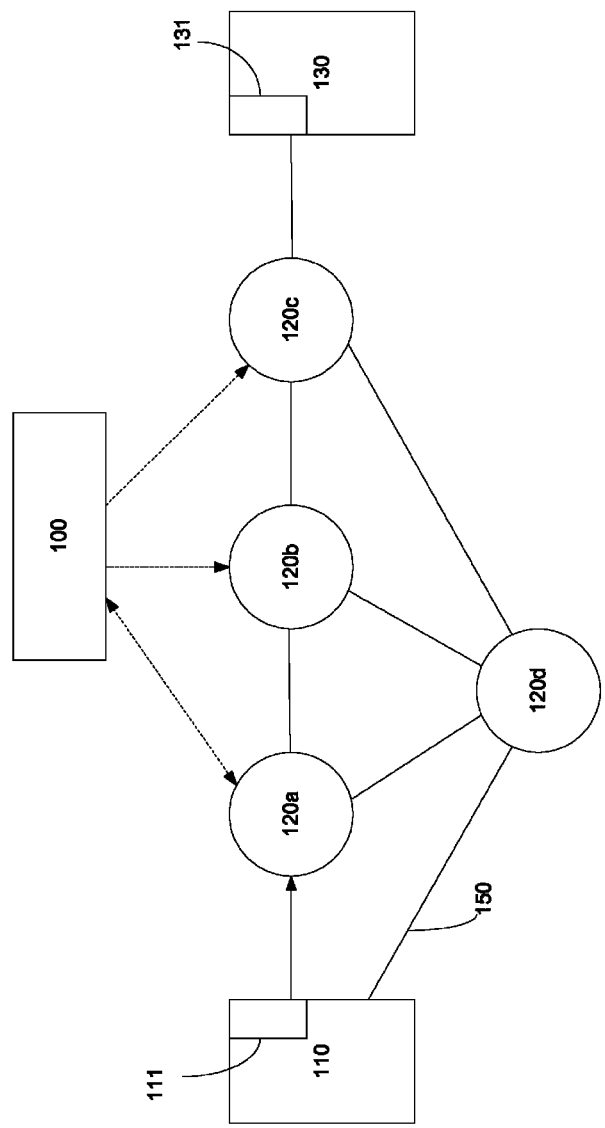

Referring to FIG. 2B, the controller 100, having assigned a set of nonces to a particular source address/destination address combination, downloads a set of routing rules to the network devices 120a-120c that are involved in the routing of the packet. The controller 100 relays these routing rules using the control channel 140. In certain embodiments, these routing rules are transmitted to every network device 120a-120d in the network. However, in other embodiments, the controller 100 only transmitted these routing rules to those network devices 120a-120c that are involved in routing this packet. For example, in this example, network device 120d is not involved in the routing of the packet from the source 110 to the destination 130. Therefore, the routing rules associated with this pair of clients may not be transmitted to this network device 120d.

In some embodiments, the controller 100 waits until it receives a third control message from a network device 120a. This third control message is referred to as a Route Request message. In this embodiment, the source proxy 111 will transmit the modified packet toward network device 120a. Network device 120a receives this modified packet and reviews its routing rules for instructions regarding proper routing of a packet having this set of nonces. When the network device 120a does not find any routing rules that correspond to this set of nonces, it sends a Route Request message to the controller 100. The Route Request message includes the set of nonces in question. In response, the controller 100 replies with a fourth control message, also referred to as a Route Response message, which provides the routing rules related to this set of nonces. The controller 100 may also send additional Route Response messages to other network devices, such as network devices 120b-120c, providing the relevant routing rules to those devices as well.

In another embodiment, the controller 100 proactively transmits these new routing rules to the network devices 120a-120c. For example, as soon as the controller 100 returns the set of nonces to the source proxy 111, the controller 100 may send a plurality of Route Response messages to the network devices involved in routing packets having this set of nonces. In this embodiment, the network devices may not be required to transmit the Route Request message, as described above. In either embodiment, the routing rules for this set of nonces is delivered from the controller 100 to all of the network devices 120a-120c involved in the routing of the packet, as seen in FIG. 2B.

Figure 2C:
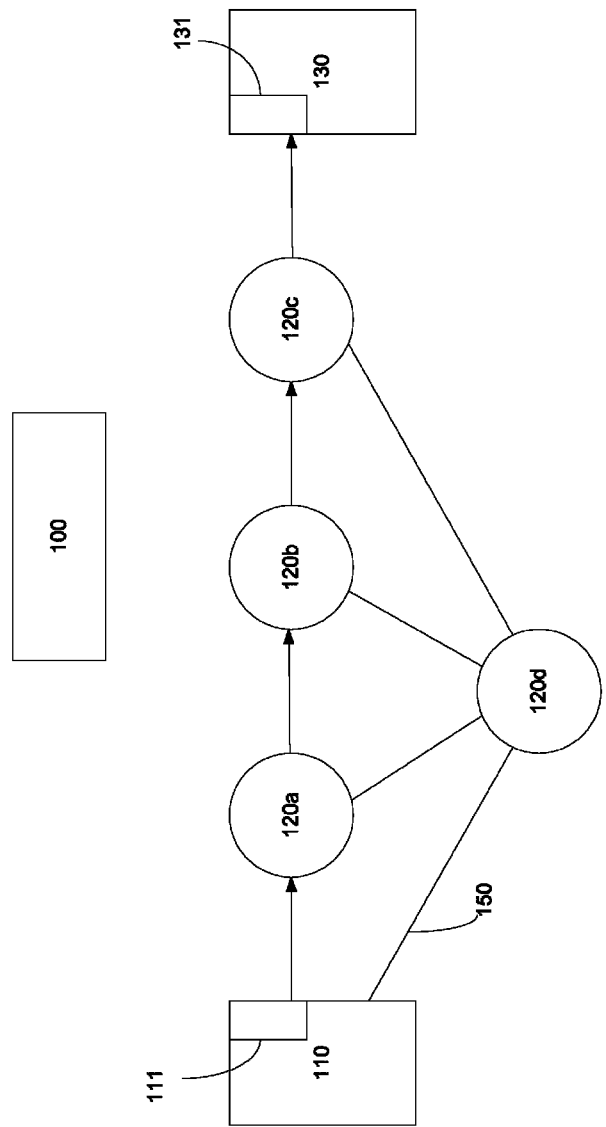

Referring to FIG. 2C, all of the network devices 120a-120c have received the new routing rules from the control. Thus, at this point, the packet can move through the network from the source 110 to the destination 130, without any further intervention from the controller 100.

FIG. 4 shows a representative set of routing rules that have been downloaded to one of the network devices 120a. Note that this figure is merely illustrative; the routing rules may be set up in a plurality of ways, which are not limited by this disclosure.

As described above, the rules comprise two columns, a destination nonce and an associated port number. Note that in this example, two different nonces are routed on port 3. This may indicate that these nonces represent two different destinations that are both located downstream from port 3. In addition, two different nonces are touted on part 7. This may indicate that both of these nonces actually refer to the same destination. Thus, through the use of nonces, it is much more difficult for an intruder to determine network topology and the location of servers in the network.

As described above, the network devices 120a-120d include a processing unit and an associated storage element. Instructions contained within the storage element allow the processing unit to execute the routing rules that are delivered by the controller 100. For example, the instructions may instruct the processing unit to parse an incoming packet to determine its destination (which is encoded as a nonce). Once the destination is determined, the processing unit reviews each of the routing rules, searching for a routing rule that pertains to this particular destination. If such a routing rule is located, the processing unit will then execute this routing rule by transmitting the packet on the port denoted in the routing rule. If such a routing rule is not located, the processing unit will send a Route Request message to the controller 100, as described above.

Figure 2D:
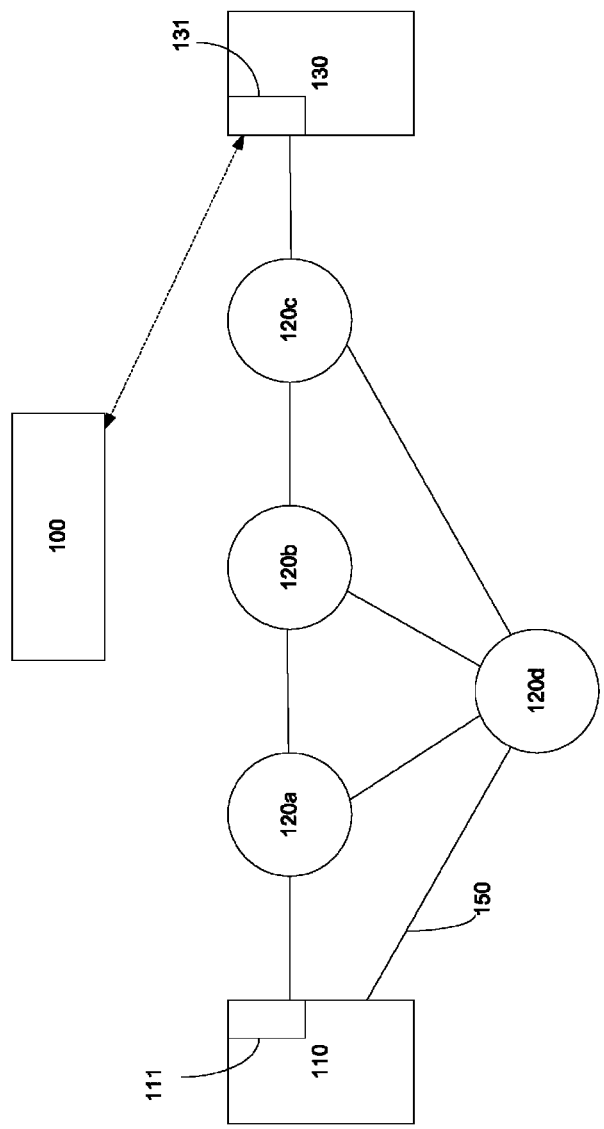

Referring to FIG. 2D, the modified packet has reached destination 130. The packet is passed to the destination proxy 131. If this packet includes a set of nonces that have not been previously used, the destination proxy 131 transmits a fifth control message to the controller 100, passing to the controller 100 the nonces that appeared in the packet. This fifth control message, also referred to as a Header Derandomization Request message, like all of the other control messages, is transmitted using the control channel 140. The controller 100 then replies using a sixth control message, also referred to as a Header Derandomization Reply message. This Header Derandomization Reply message contains the actual source and destination addresses that were originally presented to the controller 100 by the source proxy 111 in FIG. 2A.

The destination proxy 131 then replaces the set of nonces with the actual source and destination addresses. The destination proxy 131 may also modify other parts of the packet header, such as the checksum. The packet is then forwarded from the destination proxy 131 to the destination 130. The packet is then processed in accordance to techniques that are well known in the art.

Figure 5:
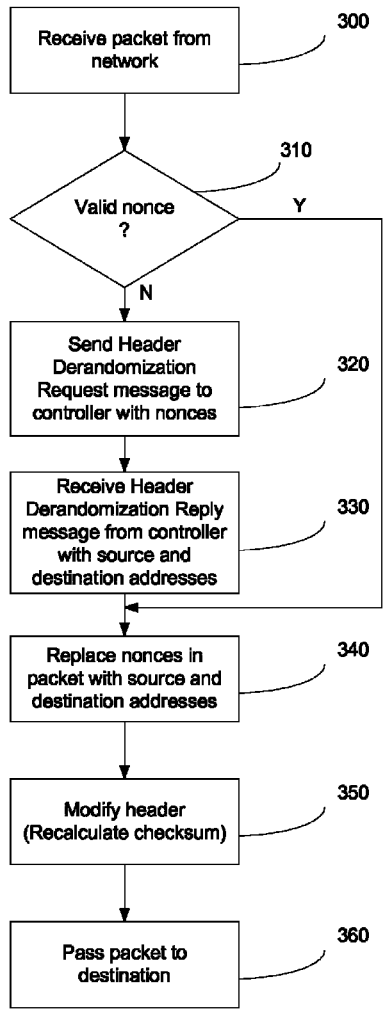
FIG. 5 shows a flowchart representing the operation of the destination proxy according to one embodiment.

FIG. 5 shows a flowchart of the operation of the destination proxy 131. As described above, the destination proxy 131 may be a software component which may be executed by the processing unit associated with the destination 130. As such, the instructions required to execute the sequence shown in FIG. 5 may be stored in a non-transitory storage medium, such as the storage element associated with the destination 130. These instructions, when executed by the processing unit, perform the functions shown in FIG. 5.

As seen in Process 300, the destination proxy 131 receives a data packet from the network. The destination proxy 131 first checks if it is aware of this set of nonces, as shown in Process 310. For example, as described above, during a previous interaction, the controller 100 may have delivered one or more sets of nonces that can be used more than once.

If the destination proxy is unaware of this set of nonces, it sends a Header Derandomization Request message to the controller 100, as shown in Process 320. This Header Derandomization Request message includes the nonces from the packet that the destination proxy 131 is processing. The destination proxy 131 then receives a Header Derandomization Reply message from the controller 100, providing the requested source and destination addresses for this set of nonces, as shown in Process 330. As described above, the Header Derandomization Reply message from the controller 100 may include an indication of validity with the source and destination addresses. For example, the controller 100 may indicate that this set of nonces may be used for multiple packets.

The destination proxy 131 then replaces the nonces in the packet with the source and destination addresses, as shown in Process 340. Note that if the destination proxy 131 is already aware of this set of nonces, it jumps directly to this process.

After replacing the nonces with the source and destination addresses, the destination proxy 131 may further modify the packet header, as shown in Process 350. For example, the destination proxy 131 may recalculate the checksum for the packet header.

After these processes are complete, the destination proxy 131 then passes the modified packet to the destination, as shown in Process 360.

In embodiments where the set of nonces can be used a plurality of times, the processes shown in FIGS. 2A-2B and 2D need not be repeated each time a set of nonces is reused. Rather, once the routing rules for a particular set of nonces is established, the network devices 120a-120d are capable of routing any additional packets using this set of nonces without any intervention from the controller 100. Further, the source and destination proxies are aware of the association between this set of nonces and the source and destination addresses.

Figures 6A, 6B, 6C:
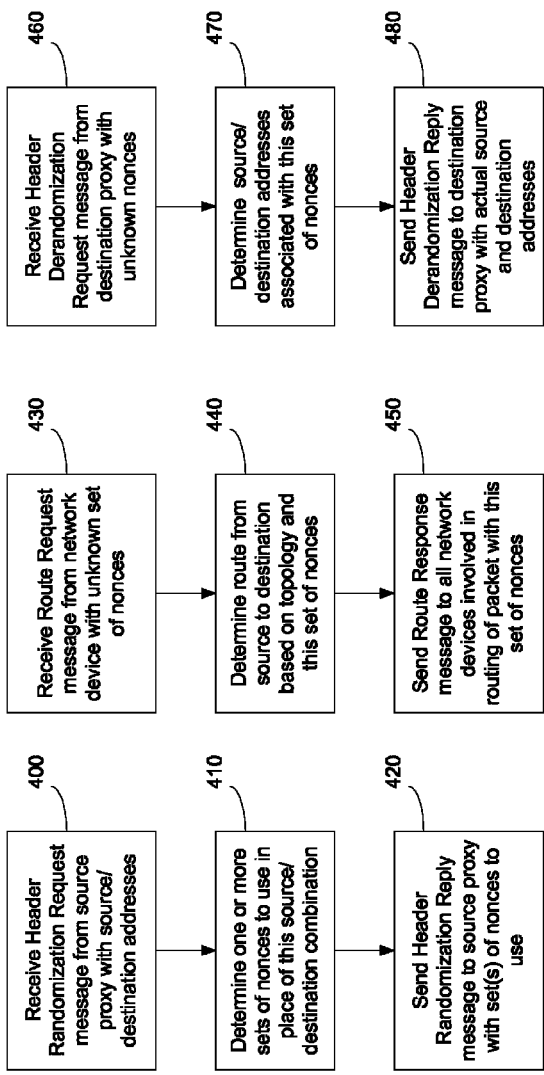
FIGS. 6A-6C show flowcharts representing the operation of the controller according to one embodiment.

In some embodiments, the transmission of a packet with a packet header that contains random nonces in lieu of the source and destination addresses may be performed using six control messages. FIGS. 6A-6C show the operation of the controller 100 during the transmission of a packet.

Two of these control messages are associated with communication between the controller 100 and the source proxy 111 to inform the source proxy 111 of the set of nonces to be used in place of a particular set of source and destination addresses. The flowchart of FIG. 6A shows the interaction between the controller 100 and the source proxy 111. As described above, the sequence begins when the source proxy 111 sends a Header Randomization Request message to the controller 100, as shown in Process 400. This Header Randomization Request message includes the actual source and destination addresses of the packet to be transmitted. In response, the controller 100 determines one or more sets of nonces that the source proxy 111 may use in place of this source/destination addresses combination, as shown in Process 410. The controller 100 then sends a Header Randomization Reply message to the source proxy 111, providing the source proxy 111 with these sets of nonces, as shown in Process 420. As described above, this Header Randomization Reply message may also include an indication of validity for the sets of nonces. This indication may define a number of uses or a time duration when the set of nonces is valid.

Two of these control messages are associated with communication between the controller 100 and the destination proxy 131 to inform the destination proxy 131 of the source and destination addresses to be used for a particular set of nonces. The flowchart of FIG. 6C shows the interaction between the controller 100 and the destination proxy 131. As described above, the sequence begins when the destination proxy 131 sends a Header Derandomization Request message to the controller 100, as shown in Process 460. This Header Derandomization Request message includes the set of nonces that were included in the packet received by the destination proxy 131. In response, the controller 100 determines the original source and destination addresses that were associated with this set of nonces, as shown in Process 470. The controller 100 then sends a Header Derandomization Reply message to the destination proxy 131, providing the destination proxy 131 with the actual source and destination addresses, as shown in Process 480. As described above, this Header Derandomization Reply message may also include an indication of validity for the sets of nonces. This indication may define a number of uses or a time duration when the set of nonces is valid.

The remaining control messages are associated with configuring the network devices 120a-120d so that the packet can be successfully routed from the source to the destination. The flowchart in FIG. 6B shows the interaction between the controller 100 and the network devices 120a-120c. As shown in Process 430, the controller 100 may receive a Route Request message from one of the network devices 120*a*, reporting that the network device 120*a* has received a packet with an unknown set of nonces. In response, the controller 100, using the set of nonces, will determine how this packet should be routed through the network. The controller 100 maintains a representation of the network topology and thus is aware of all of the clients and network devices in the network. For example, the controller 100 is aware of the connection associated with each port in each network device 120*a*-120*d*. The controller 100 may use the nonces to determine the original source and destination addresses. Using the network topology and the source and destination addresses, the controller 100 may determine an appropriate path for the packet to traverse the network, as shown in Process 440. Once the controller 100 has determined the appropriate path, it may send a Route Response message, containing the routing rules, to each network device 120*a*-120*c* that will be participating in the routing of this packet, as shown in Process 450. Thus, in the example illustrated in FIGS. 2A-2D, the controller 100 may send three Route Response messages. In certain embodiments, the routing rules may include an indication of validity. For example, a routing rule may be transmitted with an expiration time. When this expiration time is reached, the network device may delete that routing rule from its storage element.

There are several variations of the flowchart shown in FIG. 6B. In one embodiment, the controller 100 may not receive the Route Request message from a network device 120*a*. Rather, once the controller 100 sends the Header Randomization Reply message to the source proxy 111, it then sends the Route Response messages to the network devices 120*a*-120*c*. This may reduce the overhead associated with this mechanism. In another embodiment, the controller 100 may send exactly one Route Response message for each third message received. For example, when network device 120*a* sends a Route Request message to the controller 100, the controller 100 sends a Route Response message to the network device 120*a*. However, the controller 100 does not send Route Response messages to network devices 120*b*-120*c* at this time. Rather, the controller 100 waits to receive a Route Request message from network device 120*b* before sending a Route Response message to that network device. Similarly, the controller 100 waits to receive a Route Request message from network device 120*c* before sending a Route Response message to that network device 120*c*.

It is noted that the overhead associated with these control messages can be reduced through the re-use of nonces. This allows the overhead associated with the control messages to be amortized over more transactions.

Further, in one embodiment, as described above, the controller 100 may transmit Route Response messages to the network devices 120*a*-120*c* after returning the Header Randomization Reply message to the source proxy 111. In a further embodiment, the controller 100 may also transmit a Header Derandomization Reply message to the destination proxy 131 without first receiving a Header Derandomization Request message from the destination proxy 131. In this embodiment, after receiving a Header Randomization Request message from the source proxy, the controller sends a Header Randomization Reply message to the source proxy 111 communicating the set of nonces that it should use. The controller 100 then sends one or more Route Request messages to the network devices 120*a*-120*c* informing them of the rules to use with this particular set of nonces. The controller then send a Header Derandomization Reply message to the destination proxy, informing it of the source and destination addresses that correspond to this new set of nonces.

The system described herein facilitates the transmission of packets having randomized headers on a network. These packets traverse the network because each network device 120*a*-120*d* in the network comprises a set of routing rules that informs that particular network device how to forward each packet. In this way, the source and destination addresses that are typically included in a packet header may be removed and replaced with randomized nonces, while still maintaining the ability to route the packet through the network. Further, since new routing rules can be continuously created, the nonces associated with a particular set of source and destination addresses may constantly change, providing greater protection against a network intruder. Advantageously, in some embodiments, this system is implemented using existing network devices that support SDN. This allows this added level of security to be added to an existing network infrastructure without the need to replace any hardware components.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transmitting a packet from a source to a destination in a network comprising:
   replacing a source address and a destination address in the packet with a set of nonces prior to its transmission;
   transmitting the packet from the source;
   sending routing rules to a network device disposed in the network, the routing rules defining the operation of the network device with respect to the set of nonces;
   receiving the packet at the destination; and
   providing the destination with the source address and destination address that correspond to the set of nonces.

2. The method of claim 1, wherein the replacing, the sending and the providing are performed by a controller in communication with the source, the destination and the network device.

3. The method of claim 2, wherein the replacing comprises:
   transmitting a Header Randomization Request message from the source to the controller, the Header Randomization Request message indicating the source address and destination address; and
   receiving from the controller a Header Randomization Reply message indicating the set of nonces to be used in place of the source address and destination address.

4. The method of claim 3, wherein the Header Randomization Reply message further comprises an indication of validity.

5. The method of claim 4, wherein the indication of validity comprises a number of times that the set of nonces may be used.

6. The method of claim 4, wherein the indication of validity comprises a duration of time when the set of nonces may be used.

7. The method of claim 3, wherein the Header Randomization Reply message comprises a plurality of sets of nonces.

8. The method of claim 2, wherein the sending is performed by the controller and the routing rules are included in a Route Response message sent by the controller to the network device.

9. The method of claim 8, wherein the sending occurs after the network device sends a Route Request message to the controller, the Route Request message including the set of nonces.

10. The method of claim 1, wherein the routing rules comprise a nonce and an associated port on the network device from which the packet should be transmitted by the network device.

11. The method of claim 2, wherein the providing comprises:
receiving from the controller a Header Derandomization Reply message indicating the source address and destination address that correspond to the set of nonces.

12. The method of claim 11, wherein the Header Derandomization Reply message is sent by the controller after the destination sends a Header Derandomization Request message to the controller, the Header Derandomization Request message including the set of nonces.

13. A software component disposed on a non-transitory medium and configured to be executed on a controller used with a network having a source and destination and a network device, wherein, when executed by a processing unit, the software component causes the controller to:
receive a Header Randomization Request message from the source, the Header Randomization Request message including a source address and a destination address;
transmit a Header Randomization Reply message to the source, the Header Randomization Reply message including a set of nonces that replace the source address and the destination address;
transmit a Route Response message to the network device, the Route Response message comprising a routing rule instructing the network device how to route a packet having the set of nonces; and
transmit a Header Derandomization Reply message to the destination, the Header Derandomization Reply message comprising the source address and destination address associated with the set of nonces.

14. The software component of claim 13, wherein the controller is further adapted to receive a Route Request message from the network device, the Route Request message comprising the set of nonces.

15. The software component of claim 14, wherein the controller transmits the Route Response message after receiving the Route Request message.

16. The software component of claim 13, wherein the controller is further adapted to receive a Header Derandomization Request message from the destination, the Header Derandomization Request message comprising the set of nonces.

17. The software component of claim 16, wherein the controller transmits the Header Derandomization Reply message after receiving the Header Derandomization Request message.

18. The software component of claim 13, wherein the routing rule comprises a nonce and an associated port on the network device from which the packet should be transmitted by the network device.

19. A network, comprising:
a source for transmitting a packet, wherein the source address and destination address in the packet is replaced with a set of nonces;
a network device for routing the packet;
a destination for receiving the packet; and
a controller adapted to:
create the set of nonces for the source address and destination address;
transmit the set of nonces to the source;
transmit routing rules to the network device, the routing rules comprising a nonce and the associated port from which the network device should transmit a packet having the nonce;
transmit the source and destination address associated with the set of nonces in the packet to the destination.

* * * * *